US010150878B2

(12) United States Patent
Ortalano et al.

(10) Patent No.: US 10,150,878 B2
(45) Date of Patent: Dec. 11, 2018

(54) PIGMENT DISPERSIONS AND PRINTING INKS WITH IMPROVED COLORISTIC PROPERTIES

(71) Applicant: Sun Chemical Corporation, Parsippany, NJ (US)

(72) Inventors: Darren Mark Ortalano, Cincinnati, OH (US); Laura Picraux, Cincinnati, OH (US); Lisa Clapp, Cincinnati, OH (US); Paul A. Merchak, Loveland, OH (US); Russell J. Schwartz, Cincinnati, OH (US)

(73) Assignee: Sun Chemical Corporation, Parsipanny, NJ (US)

( * ) Notice: Subject to any disclaimer, the term of this patent is extended or adjusted under 35 U.S.C. 154(b) by 3 days.

(21) Appl. No.: 14/434,927

(22) PCT Filed: Mar. 14, 2013

(86) PCT No.: PCT/US2013/031530
§ 371 (c)(1),
(2) Date: Apr. 10, 2015

(87) PCT Pub. No.: WO2014/062227
PCT Pub. Date: Apr. 24, 2014

(65) Prior Publication Data
US 2015/0252201 A1    Sep. 10, 2015

Related U.S. Application Data

(60) Provisional application No. 61/714,101, filed on Oct. 15, 2012.

(51) Int. Cl.
| | | |
|---|---|---|
| *C09D 11/107* | (2014.01) | |
| *C09D 11/037* | (2014.01) | |
| *B05D 1/28* | (2006.01) | |
| *C09D 11/322* | (2014.01) | |
| *C08K 5/23* | (2006.01) | |
| *C08K 5/3417* | (2006.01) | |
| *C09D 7/41* | (2018.01) | |
| *C09D 7/40* | (2018.01) | |

(52) U.S. Cl.
CPC .............. *C09D 11/107* (2013.01); *B05D 1/28* (2013.01); *C08K 5/235* (2013.01); *C08K 5/3417* (2013.01); *C09D 7/41* (2018.01); *C09D 7/67* (2018.01); *C09D 7/68* (2018.01); *C09D 11/037* (2013.01); *C09D 11/322* (2013.01)

(58) Field of Classification Search
None
See application file for complete search history.

(56) References Cited

U.S. PATENT DOCUMENTS

| | | |
|---|---|---|
| 3,951,892 A | 4/1976 | Drury, Jr. et al. |
| 4,056,402 A | 11/1977 | Guzi, Jr. |
| 4,362,179 A | 12/1982 | MacPhee et al. |
| 4,388,434 A | 6/1983 | Swift et al. |
| 4,449,394 A | 5/1984 | Hegedus |
| 4,517,249 A | 5/1985 | Panush |
| 5,401,790 A | 3/1995 | Poole et al. |
| 5,714,526 A | 2/1998 | Whyzmuzis |
| 5,820,666 A | 10/1998 | Babler |
| 5,833,743 A | 11/1998 | Elwakil |
| 5,853,870 A | 12/1998 | Uchimura et al. |
| 5,891,950 A | 4/1999 | Collins et al. |
| 6,090,193 A | 7/2000 | Nigam et al. |
| 6,318,256 B1 | 11/2001 | Hirai |
| 6,432,192 B1 | 8/2002 | Cook et al. |
| 6,494,943 B1 | 12/2002 | Yu et al. |
| 6,506,245 B1 | 1/2003 | Kinney et al. |
| 6,517,630 B1 * | 2/2003 | Grandidier .......... C09B 67/0001 106/493 |
| 6,562,889 B2 | 5/2003 | Rao |
| 6,605,664 B2 | 8/2003 | Kanou et al. |
| 6,620,229 B2 * | 9/2003 | Doi ........................ C09D 11/30 106/31.6 |
| 6,638,353 B1 | 10/2003 | Rathschlag et al. |
| 6,669,769 B2 | 12/2003 | Smith |
| 6,709,503 B1 | 3/2004 | Krishnan et al. |
| 6,726,762 B2 | 4/2004 | Okamoto et al. |
| 6,822,782 B2 | 11/2004 | Honeyman et al. |
| 6,902,613 B2 | 6/2005 | Babler |

(Continued)

FOREIGN PATENT DOCUMENTS

| | | | | |
|---|---|---|---|---|
| CA | 2664923 A1 * | 4/2008 | .......... | B41M 5/0047 |
| DE | 19933139 | 1/2001 | | |

(Continued)

OTHER PUBLICATIONS

Baxter, K.F., "Formulation of Coatings Compositions," Chapter 9, The Chemistry and Physics of Coatings, A. Marrion Ed., The Royal Society of Chemistry, 1994, p. 165, 3 pgs.

Lacke and Druckfarben, Rompp Lexikon, 1998 Georg Theime Verlag, Stuttgart, Germany, 7 pgs.

Zollinger, H., Color Chemistry—Syntheses, Properties and Applications of Organic Dyes and Pigments, Second, revised Edition, 1991, 3 pgs.

(Continued)

*Primary Examiner* — Vu A Nguyen
(74) *Attorney, Agent, or Firm* — Frost Brown Todd LLC

(57) ABSTRACT

The present invention describes a pigment dispersion and a printing ink and coating employing the pigment dispersion. The pigment dispersion includes a pigment, binder and solvent. The pigment dispersion has a mean particle size less than about 120 nm. The printing ink or coating includes the pigment dispersion in addition to a solvent. The printing ink or coating has a solid binder to pigment ratio greater than about 1.5.

16 Claims, No Drawings

(56) References Cited

U.S. PATENT DOCUMENTS

| | | |
|---|---|---|
| 6,913,642 B2 | 7/2005 | Grandidier et al. |
| 7,151,131 B2 | 12/2006 | Kenworthy |
| 7,318,864 B2 | 1/2008 | Reisacher et al. |
| 7,338,621 B2 | 3/2008 | Tahon et al. |
| 7,368,148 B2 | 5/2008 | Nakamura et al. |
| 7,420,549 B2 | 9/2008 | Jacobson et al. |
| 7,488,064 B2 | 2/2009 | Watanabe |
| 7,553,365 B2 | 6/2009 | Sakamoto et al. |
| 7,611,572 B2 | 11/2009 | Nogami et al. |
| 7,682,443 B2 | 3/2010 | Sato et al. |
| 7,789,333 B2 | 9/2010 | Zakheim et al. |
| 7,812,809 B2 | 10/2010 | Choi et al. |
| 7,898,718 B2 | 3/2011 | Feenstra et al. |
| 8,133,937 B2 | 3/2012 | Ward et al. |
| 8,319,759 B2 | 11/2012 | Jacobson et al. |
| 8,344,047 B2 | 1/2013 | Shigemori et al. |
| 2004/0058202 A1 | 3/2004 | Payne et al. |
| 2004/0171718 A1* | 9/2004 | Nakamura ............ C09D 11/30 523/160 |
| 2007/0001927 A1 | 1/2007 | Ricks et al. |
| 2009/0018230 A1 | 1/2009 | Chisholm et al. |
| 2009/0233062 A1* | 9/2009 | Nakamura .............. C08F 8/00 428/195.1 |
| 2010/0092737 A1* | 4/2010 | Bisson ............... C09B 67/0013 428/195.1 |
| 2011/0021763 A1* | 1/2011 | Tateishi ............. C09B 29/0037 534/755 |
| 2012/0046378 A1 | 2/2012 | Sloan |
| 2012/0154492 A1* | 6/2012 | Hakiri ................. B41J 2/17513 347/86 |
| 2012/0196966 A1* | 8/2012 | Ozawa ................ C09D 11/322 524/377 |
| 2013/0002776 A1* | 1/2013 | Nagashima ............. B41M 5/52 347/100 |

FOREIGN PATENT DOCUMENTS

| | | |
|---|---|---|
| EP | 2233540 | 9/2010 |
| GB | 1498381 | 1/1978 |
| GB | 2345009 | 6/2000 |
| WO | WO 1996/26986 | 9/1996 |
| WO | WO 2005/012448 | 2/2005 |
| WO | WO 2009/053751 | 4/2009 |
| WO | WO 2009/086868 | 7/2009 |
| WO | WO 2009/098509 | 8/2009 |
| WO | WO 2009/146416 | 12/2009 |
| WO | WO 2011/021051 | 2/2011 |
| WO | WO 2014/062227 | 4/2014 |

OTHER PUBLICATIONS

International Search Report and Written Opinion dated Jun. 6, 2013 for Application No. PCT/US2013/031530.

Leach and Pierce, eds., The Printing Ink Manual, 5$^{th}$ Edition, 2007, pp. 599-603, 678-685, 694-697.

* cited by examiner

PIGMENT DISPERSIONS AND PRINTING INKS WITH IMPROVED COLORISTIC PROPERTIES

CROSS REFERENCE TO RELATED APPLICATIONS

This application hereby claims the benefit of PCT/US2013/031530, filed on Mar. 14, 2013, which claimed benefit of the provisional patent application entitled "PIGMENT DISPERSIONS AND PRINTING INKS WITH IMPROVED COLORISTIC PROPERTIES," Ser. No. 61/714,101, filed on Oct. 15, 2012, the disclosure of which is hereby incorporated by reference in its entirety.

BACKGROUND OF THE INVENTION

Field of the Invention

The present invention describes pigment dispersions of a predetermined particle size employed for offset lithographic, flexographic, gravure and screen printing applications. The present invention also describes novel ink compositions including pigment dispersions.

Description of the Related Art

Pigments have been used by civilizations for thousands of years as a tool for expression. In ancient times, pigments were cast onto walls or murals to depict epic stories that were passed down from one generation to the next. In modern times, pigments have been used in various applications such as, for example, primary or secondary packaging, graphic arts, waterborne paints, cosmetics, pharmaceutical preparations, automotive coatings, industrial coatings.

Pigments are generally employed in combination with a binder/vehicle and intimately admixed into a carrier/solvent to ensure a stable dispersion. Stable dispersions require complete wetting of the pigments and their even distribution in the surrounding vehicle. Namely, these stable dispersions are colloidal suspensions which do not settle under their own gravitational forces. By so doing, the dispersed particles avoid reagglomeration and flocculation during further processing or storage.

To ensure maximum color strength, a narrow distribution of small sized pigment particles is preferred in a dispersion. Specifically, color strength is proportional to the exposed surface area of the pigment. Other characteristics such as gloss and transparency also are improved. With ever-increasing demands from consumers for end-products exhibiting improved color strength, gloss and transparency, a need thus exists in the market for pigment dispersions with small pigment particle sizes without compromising on stability. A further need exists in the art for employing such pigment dispersions and end-products, such as ink, coatings, or paints, in contact printing applications such as offset lithography, flexography, gravure printing and screen printing.

From a manufacturing perspective, pigments are the most expensive component of the pigment dispersion. With rising production costs and reduced profit margins in the manufacturing industry, cost-cutting measures have become a top priority for most pigment dispersion and ink manufacturers. A need thus exists for a pigment dispersion employing reduced pigment amounts while maintaining equal or improved color strength, gloss and transparency characteristics. A further need yet exists in the art for employing reduced pigment amounts in pigment dispersions and inks employed in contact printing applications such as offset lithography, flexography, gravure, and screen printing applications, different from non-contact printing applications such as ink jet printing.

SUMMARY OF THE INVENTION

It has surprisingly been found by the inventors that their pigment dispersions exhibit improved color strength, gloss and transparency in printing applications such as offset lithography, flexography, gravure and screen printing. Improved color characteristics also is exhibited in coating and ink formulations employing such pigment dispersions. The ink is applied onto articles existing in fields such as graphic arts and/or corrugated packaging.

Namely, formulations such as aqueous and non-aqueous inks, paints and coatings include the above-mentioned pigment dispersions having a reduced particle size in combination with suitable binders and solvents in specified amounts. By so doing, color characteristics significantly are improved in contact printing applications such as offset lithography, flexography, gravure and screen printing applications, and especially when applied onto substrates including but not limited to plastics, non-woven fibers and textiles.

One advantage of the present invention is the use of such pigment dispersions with a reduced particle size of a mean volume weight number (d50) particle size less than 120 nm in application such as offset lithography, flexography, gravure and screen printing. In one embodiment, the inks, coatings or paints including such pigment dispersion, exhibit viscosities greater than about 35 cps, preferably greater than 200 cps, even more preferably greater than 1,000 cps.

Another advantage of the present invention includes ink or coating formulations including low amounts of colorants such as pigments, which still exhibit similar or better color characteristics as other dispersions.

In the present invention, there is also described another embodiment with an ink employing the above-mentioned pigment, in combination with a binder and solvent. The solid binder to pigment ratio of the ink is greater than about 1.5. Moreover, the mean volume weighted number (d50) particle size of the pigment is less than 120 nm. In one embodiment, the amount of pigment is less than about 10 wt. %. In one embodiment, the viscosity is greater than or equal to 1 cps, preferably grater than 35 cps, even more preferably greater than 1,000 cps.

In the present invention, there is described a method of coloring an article with an ink. Included are articles such as, for example, paper, plastics, corrugated packaging, textiles, non-woven substrates, wall coverings, floor coverings and laminates.

Also provided is a method of coloring an article with a printing ink or coating including a pigment dispersion. The pigment dispersion has a (d50) particle size less than 120 nm. In the method, there includes a step of providing the substrate including a surface and a step of providing a printing ink or coating including a pigment dispersion with a mean particle size (d50) less than about 120 nm. Also included is a step of transferring the ink or coating onto a transfer object. The transfer object, for example, may be an offset plate, a screen mesh, stencil. The transfer object is employed to transfer the ink or coating onto a surface of the substrate.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

DETAILED DESCRIPTION OF THE INVENTION

Reference will now be made in detail to the embodiments of the present invention, and examples included herein.

Definitions

The definitions of the technical and scientific terms provided herein encompass definitions intended at the time. These definitions are not meant to be restrictive, as there can be other aspects to the definitions that are not recited, such as those commonly understood by one of skill in the art to which the invention(s) belong. All patents, patent applications, published applications and publications, websites and other published materials referred to throughout the entire disclosure herein, unless noted otherwise, are incorporated by reference in their entirety. In the event that there are pluralities of definitions for terms herein, those in this section prevail. Where reference is made to a URL or other such identifier or address, it is understood that such identifiers can change and particular information on the internet can come and go, but equivalent information is known and can be readily accessed, such as by searching the internet and/or appropriate databases. Reference thereto evidences the availability and public dissemination of such information.

It is to be understood that both the foregoing general description and the following detailed description are exemplary and explanatory only and are not restrictive of the subject matter claimed. In this application, the use of the singular includes the plural unless specifically stated otherwise. In this application, the use of "or" means "and/or" unless stated otherwise. Furthermore, use of the term "including" as well as other forms, such as "includes," and "included" is not limiting.

As used herein, ranges and amounts can be expressed as "about" a particular value or range. "About" also includes the exact amount. Hence "about 10%" means "about 10%" and also "10%."

As used herein, "optional" or "optionally" means that the subsequently described event or circumstance does or does not occur, and that the description includes instances where the event or circumstance occurs and instances where it does not. For example, an optionally substituted group means that the group is un-substituted or is substituted.

As used herein, the singular forms "a," "an" and "the" include plural referents unless the context clearly dictates otherwise. Thus, for example, reference to a composition comprising "a solvent" includes compositions with one or a plurality of solvents.

As used herein, a "combination" refers to any association between two or more items. The association can be spatial or refer to the use of the two or more items for a common purpose.

As used herein, a "composition" refers to any mixture of two or more products or compounds (e.g., solvents, resins, additives, etc.). It can be a solution, a suspension, liquid, powder, a paste, aqueous or non-aqueous formulations or any combination thereof.

As used herein, "homogeneous" with reference to a composition means that the components are in the liquid phase as a mixture, including as a solution or suspension.

As used herein the terms "mill," "milling" or "milled" refer to processes for agitating, grinding, crushing, crumbling, compressing, rolling, or otherwise reducing the size of particles. Such milling can, for example, reduce pigment particles to a powder or small granules.

Introduction

The inventors of the present invention have discovered pigment dispersions of a predetermined particle size exhibiting improved color strength in printing applications such as offset lithography, flexography, gravure and screen printing. The inventors also have discovered printing ink or coating compositions employing the above-mentioned pigment dispersions exhibiting improved color strength characteristics. In one embodiment, the ink is applied onto an article, such as for example, plastics, paper, corrugated packaging, non-woven fibers and textiles. In an another embodiment, these pigment dispersions or inks are used in printing applications other than Digital printing such as ink jet and xerography.

Formulations of aqueous and non-aqueous inks, paints and coatings at least include the above-mentioned pigment dispersion. The pigment dispersion has a mean volume weighted average (d50) particle size less than 120 nm. These ink or coating formulations also include a binder/vehicle in combination with a solvent/carrier. The binder and solvent are provided in sufficient amounts to ensure optimal color strength. Of the final ink and coating formulation. Specifically, it has been observed by the inventors that their solid binder to pigment ratio in the ink formulation is greater than or equal to 1.50:1. By so doing, the color strength, gloss and contrast ratio of an ink or coating is applied onto an article and exhibits improved color strength. In addition, the ink or coating formulations include very small amounts of colorants/pigments and yet still exhibit similar or better color characteristics as commercial pigment dispersions. In another embodiment, the formulations are used for printing on primary or secondary packaging. The ink or coating formulations are used in graphic art applications, waterborne paints, cosmetics, pharmaceutical preparations, automotive coatings and industrial coatings.

In one embodiment, there is a disclosed a method of preparing a pigment dispersion. The method includes a solid milling agent, such as an alkali-soluble, acid-soluble, or solvent-soluble polymeric material, used as milling media in the presence of a pigment dispersion of pigment particles, binder liquid carrier, and optionally, other additives. The pigment dispersion and solid milling agent are milled until sufficient particle size reduction has occurred. In a further exemplary embodiment, milling is carried out by agitation. Once the pigment particles of the premix are dispersed (i.e., particle size reduction is completed), the media and premix are separated. Separation can be conducted by any known technique including but not limited to filtration.

Examples of solid materials that can be milled according to the methods disclosed herein and include solid colorants such as pigments for printing inks in conventional printing techniques such as offset lithography, flexography, gravure and screen printing. The colorants may also be employed for plastics, high-transparency colorants for electronic display color filter arrays, solid photographic materials such as dyes, solid cosmetic ingredients, solid automotive coatings, solid architectural coatings, solid chemicals, solid metal powders, solid catalyst materials, solid support material for catalysts, solid stationary phase particles or support materials useful in analytical and preparative chromatography, solid toner materials such as black toner materials and colored toner materials that are useful in xerographic and printing applications including laser printing, and solid pharmaceutical agents including water-soluble, water-insoluble, essentially water-insoluble and poorly water-soluble therapeutic and diagnostic imaging agents, medicinally active agents, medicaments, plant and herbal extracts, drugs, pro-drugs, drug formulations, diagnostic imaging agents, and the like.

Examples of milling equipment employed to reduce the particle size of pigment dispersions include but are not limited to media mills, homogenizers, high speed mixers, and mixers with media incorporated within. The media mills may be horizontal, vertical, or batch such as equipment produced under the names of Netzsch, Premier, Hockmeyer, Dyno-mills, ball mills, roller mills and the like. Other equipment that do not use milling media such as homogenizers, three roll mills, two roll mills, and microfluidizers are also acceptable for particle size reduction. Other particle size reduction techniques are also within the scope of this invention and are known by those skilled in the art.

In another embodiment, there is described a printed article comprising a substrate and a printing ink or coating composition including the disclosed pigment dispersion. The printing ink applied onto at least one area or portion of a surface of the substrate. The substrate can be any known substrate that is desirably employed in contact printing applications such as, for example, offset lithography, gravure, flexography and screen printing.

In yet another embodiment, there is disclosed a method of coloring an article with a pigment dispersion. Namely, an ink or coating is transferred onto a transfer object. The transfer object comes into contact with a surface of the article, such as a substrate. The ink or coating is transferred from the transfer object to the surface. In an exemplary application, the method of coloring is employed contact applications such as offset lithography, flexography, gravure and screen printing applications.

Pigment Dispersion

According to one aspect of the invention, there is described a pigment dispersion. The pigment dispersions include pigments, binders, solvent and optionally, one or more additives. Each of these components will be discussed in further details below.

The pigments used in the methods provided herein can include any pigment. The pigment can be in the form of an organic or an inorganic pigment and can include specialty pigments. Examples of pigments include, but are not limited to, carbon black, phthalocyanines (for example, phthalocyanine blue and phthalocyanine green), quinacridones (such as quinacridone magenta), perylenes, perinones, diketopyrrolos, pyrroles, thioindigos, isoindoline, iminoisoindoline, azomethine, methane, olinone, benzimidazolone, anthraquinones, quinacridone, flavanthrone, indanthrone, anthrapyrimidine, quinophthalone, isoviolanthrone, pyranthrone pigments indanthrones, anthrapyrimidines, flavanthrones, pyranthrones, anthanthrones, dioxazines, triarylcarboniums, and quinophthalones; dianisidine orange; dinitroaniline orange; carbazole violet; azo compounds (for example, azo reds and azo yellows); precipitated dyes and those pigments found in the Colour Index International, or any combination thereof.

Non-limiting specific examples of organic pigments are C.I. Pigment Black 1, 2, 3, 31 and 32; C.I. Pigment Green 7, 36, 37, 47, 54, and 58; C.I. Pigment Blue 15:1, 15:2, 15:3, 15:4, 15:6, 16, 21, 22, 60, 64, 65, 75, and 76; C.I. Pigment Violet 19, 23, 29, 31, 33, and 37; C.I. Pigment Red 122, 123, 144, 149, 166, 168, 170, 171, 175, 176, 178, 179, 180, 183, 189, 190, 192, 196, 202, 208, 209, 214, 216, 220, 221, 224, 226, 242, 248, 254, 255, 260, 264, and 271; C.I. Pigment Orange 36, 40, 43, 51, 60, 61, 62, 64, 66, 69, 71, 72, 73, and 77; C.I. Pigment Yellow 24, 74, 83, 93, 94, 95, 108, 109, 110, 120, 123, 138, 139, 150, 151, 154, 155, 167, 170, 171, 173, 174, 175, 180, 181, 185, 192, 193, 194, 199, 213, and 218. Also included are mixtures of pigments and mixed crystals.

A non-limiting list of inorganic pigment examples includes carbon black, metal oxide, mixed metal oxide, sulfide, sulfate. Non-limiting specific examples are titanium dioxide, zinc oxide, iron oxide, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, bismuth vanadate, as well as derivatives, other inorganic pigments and any combinations thereof. Further specific examples of inorganic pigments are Pigment Black 6, 7, 9, 11, 12, 14, 15, 22, 26, 27, 28, 29, 30, 33, 34 and 35; C.I. Pigment Green 18, 20, 21 and 22; C.I. Pigment Blue 27, 30, and 73; C.I. Pigment Red 265 and 275; C.I. Pigment Yellow 38, 40, 53, 119, 157, 158, 160, 161, 162, and 184; C.I. Pigment White 4, 5, 6, 6:1, 7, 8, 9, 10, 12, 13, 14, 15, 18, 18:1, 19, 21, 22, 23, 24, 25, 26, 27, 28, 32, 33, and 36.

The pigment can also be any known extender, for example oxide, carbonate, sulfate, sulfide, phosphate, and can be synthetic or mineral. Non-limiting examples of usable extenders are calcium carbonate, blanc fixe, mica, kaolin, clay, silica, and the like and combinations thereof.

In the premix compositions used in the methods provided herein, the total amount of colorant as a percentage (%) by weight of the composition (wt %) can be, between about 5% to 80%, such as for example 5% to 10%, 5% to 15%, 5% to 25%, 5% to 30%, 5% to 40%, 5% to 50%, 5% to 60%, 5% to 70%, 5% to 80%, 10% to 20%, 10% to 30%, 10% to 40%, 10% to 50%, 10% to 60%, 10% to 70%, 10% to 80%, 15% to 25%, 15% to 30%, 15% to 35%, 15% to 40%, 15% to 45%, 15% to 50%, 15% to 60%, 15% to 70%, 15% to 80%, 20% to 30%, 20% to 40%, 20% to 50%, 20% to 60%, 20% to 70%, 20% to 80%, 25% to 30%, 25% to 35%, 25% to 40%, 25% to 45%, 25% to 50%, 25% to 60%, 25% to 70%, 25% to 75%, 25% to 80%, 30% to 40%, 30% to 50%, 30% to 60%, 30% to 70%, 30% to 75%, 40% to 50%, 40% to 55%, 40% to 60%, 40% to 65%, 40% to 70%, 40% to 75%, 40% to 80%, 45% to 50%, 45% to 55%, 45% to 60%, 45% to 65%, 45% to 70%, 45% to 75%, 45% to 80%, 50% to 55%, 50% to 60%, 50% to 65%, 50% to 70%, 50% to 75%, 50% to 80%, 55% to 60%. 55% to 65%, 55% to 70%, 55% to 75%, 60% to 70% and 60% to 80%.

Generally, the pigment dispersion contain less than 80% (wt %) colorant. For example, the compositions provided herein contain less than 79%; 78%; 77%; 76%; 75%; 74%; 73%; 72%; 71%; 70%; 69%; 68%; 67%; 66%; 65%; 64%; 63%; 62%; 61% 60%; 59%; 58%; 57%; 56%; 55%; 54%; 53%; 52%; 51%; 50%; 49%; 48%; 47%; 46%; 45%; 44%; 43%; 42%; 41%; 40%; 39%; 38%; 37%; 36%; 35%; 33%; 32%; 31%; 30%; 29%; 28%; 27%; 26%; 25%; 24%; 23%; 22%; 21%; 20%; 19%; 18%; 17%; 16%; 15%; 14%; 13%; 12%; 11%; 10%; 9%; 8%; 7%; 6%; 5%; 4%; 3%; 2%; and 1%.

The pigment dispersion used in the methods provided herein include one or more binders. In one embodiment, there is a first and second binder. In one embodiment, the first and second binders are the same. In an alternative embodiment, the first and second binders are different.

The binder used in the present invention is intended to incorporate the broadest definition of the term. Binders are typically used to stabilize the pigment particles in the solvent or liquid carrier. Binders also are typically used to improve separation of particles and to prevent settling or clumping of the particles.

In an exemplary embodiment, the binder is added to the dispersion to aid in pigment stabilization. In another embodiment, the binder imparts gloss to the final dispersion. In yet another embodiment, the binder improves adhesion to a variety of substrates in a further embodiment, the binder allows improved curing to occur in the case of energy curable products. In yet even a further embodiment, the binder decreases surface effects such as bronzing, and to impart compatibility with the final product and allow for improved resolubility of inks on the press. The dispersion binder to pigment ratio may vary depending on the best formulation for producing the dispersion.

The binders can include resins, rosins, and other polymeric species. The binder can include those conventionally employed in ink, coating, plastic, imaging fluids, master batches, and other applications or is compatible with the components of the applications inferred in this invention. The binder is chosen based upon one or more considerations, such as the solvent system and pigment particle used in the pigment dispersion. These binders include but are not limited to acrylic acids or methacrylates, rosins of abietic acid or pentaerythritol which may or may not be chemically modified with hydrogenation, dehydrogenation, disproportionation, dimerised, polymerized, esterified, maleic or phenolic modified, styrene based polymers such as polystyrene or styrene maleic anhydrides which may be modified as esters, amides, or with other such groups, epoxy, polyester, polyurethane, silicone, vinyl, blocked isocyanate, cellulose ester, alkyds, and copolymers, block copolymers, and other polymeric species derived from these resins. These binders may be used in aqueous, solvent, or monomer systems and are not limited to chemical class.

Suitable binders may also include natural or synthetic dispersants, such as surfactants, resins, polymers, or mixtures thereof. The surfactants can include synthetic surfactants, such as anionic surfactants, nonionic surfactants, cationic surfactants and amphoteric surfactants, or natural surfactants. Anionic surfactants can include, but are not limited to, phosphate esters, carboxylic acids, sulfonates and sulfates. Nonionic surfactants can include, but are not limited to, acetylenics, alkyl phenol ethoxylates/propoxylates, EO/PO block copolymers, linear or branched alcohol ethoxylates and esters. Cationic surfactants can be chosen from among primary, secondary, tertiary and quaternary amines and imides. Suitable amphoteric surfactants can include, for example, derivatives of aliphatic secondary and tertiary amines; alkali metal, alkaline earth metal, ammonium or substituted ammonium salts of alkyl amphocarboxy glycinates and alkyl amphocarboxypropionates; alkyl amphodipropionates, alkyl amphodiacetates, alkyl amphoglycinates, and alkyl amphopropionates; alkyl iminopropionates, alkyl iminodipropionates, and alkyl amphopropylsulfonates. Natural surfactants can include, but are not limited to, lecithin, fatty acids, glucamides, glycerides and polysaccharides. Exemplary surfactants include octylphenolethoxylates and acetylenics, and those surfactants found in the McCutcheon's Directory of Surfactants and Emulsifiers.

There also are many commercially available binders including, but not limited to, Rhodasurf® (Rhodia), Triton® (Dow), Soprophor® (Rhodia), Igepal® (Rhodia), EFKA® (Ciba), Solsperse® (Lubrizol), BYK® (BYK Chemie), Tegospers®, (Tego), Joncryl® (BASF), Neocryl® (DSM), Vancryl® (Cytec), Morcryl® (Dow) SMA® (Cray Valley) and Acrysol® (Dow), Vinnol® (Wacker), McGee Oils, Ethocel from Dow, epoxy acrylate oligomers, urethane acrylate oligomers, polyester acrylate oligomers and acrylate monomers from Sartomer, Cytec and IGM Resins, and others that will be known to those of skill in the art.

In the compositions provided herein, the total amount of binder as a percentage (%) by weight of the pigment dispersion is (wt %) between from or between about from 1% to 25%, such as 1% to 5%, 1% to 10%, 1% to 15%, 1% to 20%, 1% to 25%, 5% to 10%, 5% to 15%, 5% to 20%, 5% to 25%, 10% to 15%, 10% to 20%, 10% to 25%, 15% to 20%, 15% to 25%, and 20% to 25%, by weight of the composition. Generally, the pigment dispersion contain less than 25 wt % binder. For example, the binder is less than about 25%; 24%; 23%; 22%; 21%; 20%; 19%; 18%; 17%; 16%; 15%; 14%; 13%; 12%; 11%; 10%; 9%; 8%; 7%; 6%; 5%; 4%; 3%; 2%; and 1%.

The pigment dispersion compositions used in the methods provided herein include one or more liquid carriers or solvents. In the milling process, the liquid carrier is used initially to suspend the particle to be dispersed by milling or agitation. The liquid carrier is chosen based on one or more desirable properties, for example, the inability to substantially dissolve the milling media. In one embodiment, the carrier is an aqueous system. The aqueous system can be, for example, water. Alternatively, the aqueous system can be a mixture of water and a water-miscible solvents. This water-miscible solvent can be acetone. Alternatively, the water-miscible solvent can be acetonitrile. In another embodiment, the water-miscible solvent can be tetrahydrofuran. In a further embodiment, the water-miscible solvent is an alcohol. In yet a further embodiment, the water-miscible solvent ban be a mixture of acetone, acetonitrile, tetrahydrofuran, or alcohols.

In yet even a further embodiment, the organic solvent-based system can be glycol ethers, glycol ether acetates, alkyl acetates, ketones, cyclohexanone, alcohols, aromatic hydrocarbons, aliphatic hydrocarbons, ethers, esters, or mixtures thereof. This organic solvent can be an alcohol. Alternatively, the organic solvent can be cyclohexanone. In yet a further embodiment, the organic solvent can be a mixture of glycol ethers, glycol ether acetates, alkyl acetates, ketones, cyclohexanone, alcohols, aromatic hydrocarbons, aliphatic hydrocarbons, ethers, or esters.

Suitable liquid carriers include water or non-aqueous solvents, such as aliphatic hydrocarbons, such as heptanes, hexanes and pentanes; cyclic hydrocarbons, such as cyclohexanone, and substituted cyclic hydrocarbons, such as ethylcyclohexane; ketones; ethers; esters; petroleum distillates, such as naphtha, petroleum ether and light aliphatic solvents; aromatic hydrocarbons and compounds, such as xylene and toluene; alkyl acetates, such as ethyl acetate, isopropyl acetate, butyl acetate, propylene glycol monomethyl ether acetate (PM acetate) and n-propyl acetate; glycols and glycol ethers, such as monopropylene glycol, dipropylene glycol, 1-ethoxy-2-propanol, 1-propoxy-propanol (PROPOSOL solvent P), propylene glycol n-propyl ether, n-butyl ether, diethylene glycol monobutyl ether, propylene glycol methyl ether and diacetone alcohol; glycol ether acetates; and alcohols, such as butyl alcohol, 3-methoxy-butanol, ethanol, propanol, isopropanol and n-propanol. In the premix compositions used in the methods provided herein, the liquid carrier can be a single liquid carrier or can be a mixture of one or more liquid carriers.

Generally, the pigment dispersion contain less than 80% (wt %) solvent. For example, the pigment dispersions contain solvents less than 79%; 78%; 77%; 76%; 75%; 74%; 73%; 72%; 71%; 70%; 69%; 68%; 67%; 66%; 65%; 64%; 63%; 62%; 61% 60%; 59%; 58%; 57%; 56%; 55%; 54%; 53%; 52%; 51%; 50%; 49%; 48%; 47%; 46%; 45%; 44%;

43%; 42%; 41%; 40%; 39%; 38%; 37%; 36%; 35%; 33%; 32%; 31%; 30%; 29%; 28%; 27%; 26%; 25%; 24%; 23%; 22%; 21%; 20%; 19%; 18%; 17%; 16%; 15%; 14%; 13%; 12%; 11%; 10%; 9%; 8%; 7%; 6%; 5%; 4%; 3%; 2%; and 1%.

In a further embodiment, the pigment dispersion contains any of the usual components used by one skilled in the art. These components include, but are not limited to defoamers, oligomers, buffering agents, pH adjustors, organic solvents, biocides and the like.

The pigment dispersion used can include components such as any of biocides, defoamers, humectants, flow and leveling agents or combinations thereof. The additional components are chosen based on the properties of the premix composition and pigment particle dispersion, such solvent system and particle type.

Biocides are typically added to compositions such as inkjet ink composition to suppress the growth of microorganisms such as molds and fungi in inks. Example of suitable biocides include, but are not limited to, sodium dehydroacetate, 2-phenoxyethanol, sodium benzoate, sodium pyridinethion-1-oxide, ethyl p-hydroxybenzoate and 1,2-benzisothiazolin-3-one and salts thereof. An exemplary commercially available biocide is PROXEL™ biocide (Arch Chemicals).

Defoamers can be added to the premix composition to prevent foaming of the composition during its preparation. Any suitable defoamer known to those of ordinary skill in the art can be used, preferably those that are miscible with the liquid. Suitable defoamers include, but are not limited to, silicone defoamers and acetylenic defoamers. In some embodiments the defoamer can contain dipropylene glycol and 2,5,8,11-tetramethyl-6-dodecene-5,8-diol. An exemplary commercially available defoamer is Surfynol DF-110D (Air Products).

Humectants can also be used and include, but are not limited to glycols, including propylene glycol, polypropylene glycol, ethylene glycol, polyethylene glycol, diethylene glycol, tetraethylene glycol; sorbitol, glycerine, triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; and mixtures and derivatives thereof.

In an exemplary embodiment, the particle size of the pigment dispersion preferably is measured on a dynamic light scattering instrument, Nanotrac® 250 (Microtrac Corporation). Examples of dynamic light scattering instrumentation are produced under the names of Microtrac, Malvern, and the like. Particle size data was collected on a Nanotrac® 250 (Microtrac Corp.) dynamic light scattering instrument using the following protocol:

Three 2-minute runs taking an average of particle size of the three runs
Particles are considered to be absorbing particles
Particle shape set at irregular
Particle Density, input is set at 1.81 gm/cm$^3$
Fluid is deionized water (refractive index=1.33)
Loading factor is 10-30
All data is reported as a volume weighted distribution.

Improved color strength, transparency, and gloss of the pigment dispersions of the present invention are related to the reduced particle size. The particle size measurement value is recorded as a volume weighted number whereby 50% of the particles are less than 120 nm (d50<120 nm), and preferably whereby the mean volume weighted average is less than 120 nm (MV<120 nm). In an exemplary embodiment, the d50 and MV values range from about 50 nm to 120 nm; 50 nm to 110 nm; 50 nm to 100 nm; 50 nm to 90 nm; 50 nm to 80 nm; 50 nm to 70 nm; 50 nm to 60 nm; 60 nm to 120 nm; 60 nm to 110 nm; 60 nm to 100 nm; 60 nm to 60 nm; 60 nm to 80 nm; 60 nm to 70 nm; 70 nm to 120 nm; 70 nm to 110 nm; 70 nm to 100 nm; 70 nm to 90 nm; 70 nm to 80 nm; 80 nm to 120 nm; 80 nm to 110 nm; 80 nm to 100 nm; 80 nm to 90 nm; 90 nm to 120 nm; 90 nm to 110 nm; and 90 nm to 100 nm In another embodiment, the d50 and MV are less than 120 nm; 119 nm; 118 nm; 117 nm; 116 nm; 115 nm; 114 nm; 113 nm; 112 nm; 111 nm; 110 nm; 109 nm; 108 nm; 107 nm; 106 nm; 105 nm; 104 nm; 103 nm; 102 nm; 101 nm; 100 nm; 99 nm; 98 nm; 97 nm; 96 nm; 95 nm; 94 nm; 93 nm; 92 nm; 91 nm; 90 nm; 89 nm; 88 nm; 87 nm; 86 nm; 85 nm; 84 nm; 83 nm; 82 nm; 81 nm; 80 nm; 79 nm; 78 nm; 77 nm; 76 nm; 75 nm; 74 nm; 73 nm; 72 nm; 71 nm; 70 nm; 69 nm; 68 nm; 67 nm; 66 nm; 65 nm; 64 nm; 63 nm; 62 nm; 61 nm; 60 nm; 59 nm; 58 nm; 57 nm; 56 nm; 55 nm; 54 nm; 53 nm; 52 nm; 51 nm; and 50 nm.

Inks and Coatings

According to another aspect of the invention, there is described a printing ink or coating composition comprising the pigment dispersion. In one embodiment, the inks are water-based. In an alternative embodiment, the inks are solvent-based, i.e., non-aqueous. In another embodiment, the ink may be radiation curable or energy curable. For such inks, ultraviolet or electron beam activated monomers, oligomers, and photoinitiators may also be employed in the ink compositions as readily used by those skilled in the art.

The viscosity of the inks, at least in one embodiment is greater than 1 cps, for example for non-contact printing applications, i.e., ink jet applications. See, for example, U.S. Pat. No. 5,833,743. In another embodiment, preferably for contact printing applications, such as, for example, offset lithography, flexography, gravure and screen printing applications. See, for example, U.S. Pat. No. 6,318,259 discussing lithographic ink viscosities, U.S. Pat. No. 4,362,179 discussing flexographic ink viscosities, U.S. Pat. No. 4,449,394 discussing gravure ink viscosities employing a Zahn Cup No. 2 at 25° C. test protocol, and The Printing Ink Manual, 5th edition (2007), Leach and Pierce, eds., pages 599-603, 678-685 and 694-697 discussing screen printing applications. For example, the viscosity of inks or coatings for non-contact printing applications is preferably greater than 35 cps. In another embodiment, the viscosity is greater than 200 cps. In another embodiment, the viscosity is greater than 1,000 cps.

In an exemplary embodiment, the ink includes less than about 60 wt. % of the pigment dispersion described above. The pigment dispersion amount may range between about 20 to 60 wt. %; 20 to 55 wt %; 20 to 50 wt. %; 20 to 45 wt. %; 20 to 40 wt. %; 20 to 35 wt. %; 25 to 60 wt. %; 25 to 55 wt %; 25 to 50 wt. %; 25 to 45 wt. %; 25 to 40 wt. %; 25 to 35 wt. %; 30 to 60 wt. %; 30 to 55 wt %; 30 to 50 wt. %; 30 to 45 wt. %; 30 to 40 wt. %; 30 to 35 wt. %. In another embodiment, the pigment dispersion amount (wt. %) in the ink may be less than about 60%; 59%; 58%; 57%; 56%; 55%; 54%; 53%; 52%; 51%; 50%; 49%; 48%; 47%; 46%; 45%; 44%; 43%; 42%; 41%; 40%; 39%; 38%; 37%; 36%; 35%; 34% 33%; 32%; 31%; 30%; 29%; 28%; 27%; 26%; 25%; 24%; 23%; 22%; 21% and 20%; 19%; 18%; 17%; 16%; 15%; 14%; 13%; 12%; 11% and 10%.

In another embodiment, the ink may contain an additional resin or resin emulsion other than the resin employed in the pigment dispersion. The resin emulsion may be selected from water-based acrylic emulsions. In one embodiment, the emulsion is selected from Joncryl® resins manufactured by BASF, and particularly Joncryl0138 (42.5% solids). The resin or resin emulsion may range between about 20 to 60 wt. %; 20 to 55 wt %; 20 to 50 wt. %; 20 to 45 wt. %; 20 to 40 wt. %; 25 to 60 wt. %; 25 to 55 wt. %; 25 to 50 wt. %; 25 to 45 wt. %; 25 to 40 wt. %; 30 to 60 wt. %; 30 to 55 wt. %; 30 to 50 wt. %; 30 to 45 wt. %; 30 to 40 wt. %; 35 to 60 wt. %; 35 to 55 wt. %; 35 to 50 wt. %; 35 to 45 wt. %; 35 to 40 wt. %; 40 to 60 wt. %; 40 to 55 wt. %; 40 to 50 wt %; 40 to 45 wt. %. In another embodiment, the resin or resin emulsion may be present in an amount (wt. %) in the ink less than about 60%; 59%; 58%; 57%; 56%; 55%; 54%; 53%; 52%; 51%; 50%; 49%; 48%; 47%; 46%; 45%; 44%; 43%; 42%; 41%; 40%; 39%; 38%; 37%; 36%; 35%; 34%; 33%; 32%; 31%; 30%; 29%; 28%; 27%; 26%; 25%; 24%; 23%; 22%; 21%; 20%.

For solvent-based inks, i.e., non-aqueous, there includes an oligomer, a multifunctional monomer and a photoinitiator. The oligomer is present in an amount (wt. %) less than or equal to about 35 wt. %; 34%; 33%; 32%; 31%; 30%; 29%; 28%; 27%; 26%; 25%; 24%; 23%; 22%; 21%; 20%; 19%; 18%; 17%; 16%; 15%; 14%; 13%; 12%; 11%; 10%; 9%; 8%; 7%; 6%; 5%; 4%; 3%; 2%; and 1%. The multifunctional monomer may be present in an amount (wt. %) less than or equal to about 20%; 19%; 18%; 17%; 16%; 15%; 14%; 13%; 12%; 11%; 10%; 9%; 8%; 7%; 6%; 5%; 4%; 3%; 2%; and 1%. The photoinitiator is present in an amount (wt. %) less than or equal to 10%; 9%; 8%; 7%; 6%; 5%; 4%; 3%; 2%; and 1%.

In another embodiment, the ink may contain a solvent. In one embodiment, the solvent comprises water. Alternatively, the solvent is 100% water. The pigment dispersion amount may range between about 20 to 50 wt. %; 20 to 45 wt. %; 20 to 40 wt. %; 20 to 35 wt. %; 25 to 50 wt. %; 25 to 45 wt. %; 25 to 40 wt. %; 25 to 35 wt. %. In another embodiment, the pigment dispersion amount (wt. %) in the ink may be less than about 50% 49%; 48%; 47%; 46%; 45%; 44%; 43%; 42%; 41%; 40%; 39%; 38%; 37%; 36%; 35%; 33%; 32%; 31%; 30%; 29%; 28%; 27%; 26%; 25%; 24%; 23%; 22%; 21% and 20%.

In another embodiment, the solid binder to pigment ratio of the ink is greater than or equal to 1.5. The binder is present in an amount to stabilize the surface area of the pigment. The binder to pigment ratio may be greater than or equal to 1.6; 1.7; 1.8; 1.9; 2.0; 2.1; 2.2; 2.3; 2.4; 2.5; 2.6; 2.7; 2.8; 2.9; 3.0; 3.1; 3.2; 3.3; 3.4; 3.5; 3.6; 3.7; 3.8; 3.9; 4.0; 4.1; 4.2; 4.3; 4.4; 4.5; 4.6; 4.7; 4.8; 4.9; 5.0; 5.1; 5.2; 5.3; 5.4; 5.5; 5.6; 5.7; 5.8; 5.9; 6.0; and 6.1.

Results and Discussion

The following examples illustrate specific aspects of the present invention and are not intended to limit the scope thereof in any respect and should not be so construed.

EXAMPLE 1

Dispersion (AAOT Yellow)

An aqueous pigment dispersion was prepared with a premix composed of the following components: 72.5% C.I. Pigment Yellow 14 press cake at 42.2% solids (474-4480 from Sun Chemical), 9.9% Joncryl® 674 resin pellets (BASF), 3.1% urea, 2.5% ammonia (28% solution), 0.2% Proxel GXL biocide (Dow), 0.1% Surfynol® DF-110D defoamer, and 29.1% water. The composition of Example 1 is provided in Table 1A below. The premix was mixed on a high speed mixer for 90 minutes. The pigment content of this mixture was 30.6% with 9.9% styrene-acrylic resin. This mixture was then milled on a recirculating Netzsch Mill (LabStar® 0.5 L) using 0.25 mm polystyrene media (Glen Mills) at 85% mill charge until a particle size of mv=84 nm and d50=71 nm was achieved. The mean particle size was determined using a Nanotrac Particle Size Analyzer (Microtrac, Mongomeryville, PA).

To test for color strength and color data, a bleach was prepared of this pigment dispersion (1 part dispersion to 50 parts Porter paint) and compared to a bleach prepared using a Control YCD-2004 (same formula, but a commercial dispersion milled on a Premier® Mill using 0.8-1.0 mm ZrSi media). Each of the pigment dispersions in Examples 2-6 below use the same bleach/drawdown method to obtain strength and color data as provided for in Example 1.

A drawdown was made using #30 Meyer rod on a Lenetta opacity card comparing Example 1 versus. the Control. The light emitted from the spectrophotometer on the drawdown and the reflectance curve was measured. The color strength is a comparative measure of the reflectance at maximum absorption of the Example versus the control. The drawdown indicated a 141% increase in strength with an adjusted DE of 2.37 and a db* of 2.15 indicating a yellower and more saturated color. By comparison, the particle size of Control YCD-2004 was mv=245 nm and d50=205 nm. The color strength data is provided in Table 1B below.

TABLE 1A

Example 1 Pigment Dispersion (AAOT Yellow)

| Material (wt. %) | Example 1 |
| --- | --- |
| Pigment Yellow 14 (42.5% solids) | 72.5 |
| Joncryl 674 Resin Pellets | 9.9 |
| Urea | 3.1 |
| Ammonia | 2.5 |
| Proxel GXL Biocide | 0.2 |
| Surfynol DF-110D Defoamer | 0.1 |
| Water | 11.7 |
| Total | 100.0 |

TABLE 1B

Properties of Pigment Dispersion (AAOT Yellow)

| Properties | Example 1 Milled with a recirculating Netzsch Mill using 500 grams of 0.25 mm Polystyrene Media for 26 hours | Control YCD-2004 (same formula as Example 1) Milled with a Premier Mill using 0.8-1.0 mm ZrSi Media |
| --- | --- | --- |
| Mean Volume particle size (nm) | 84 | 245 |
| D50 means particle size (nm) | 71 | 205 |
| Color Strength (%) | 141 | — |
| Adjusted DE | 2.47 | — |
| db* (units) | 2.15 | — |

EXAMPLE 2

Dispersion (Phthalocyanine Blue)

A small particle size blue aqueous dispersion was prepared by taking a finished blue dispersion, BCD-9448 (Sun Chemical) having a particle size of mV=210 nm and a d50=190 nm. The composition included 37.9% pigment, 0.7% resin, 8.9% surfactant and 52.5% water. This dispersion was milled further on a Labstar® Netzsch mill containing 0.20 mm polystyrene milling media (Glen Mills). The media charge was 85%, and the mill was run at 1.3 kw for five hours at which time a particle size of mv=114 nm and d50=106 nm was attained. The composition is provided in Table 2A below.

A bleach of this dispersion (1 part dispersion to 50 parts Porter paint) versus that of BCD-9448 indicated a 111% strength with an adjusted DE of 1.55 and a db* of −1.47 indicating a bluer color. The results are provided in Table 2B below.

TABLE 2A

Example 2 Pigment Dispersion (Phthalocyanine Blue)

| Materials (wt. %) | Example 2 BCD-9448 |
| --- | --- |
| Pigment Blue | 37.9 |
| Joncryl 674 Resin Pellets Resin Solution (30% solids, 70% water, ammonia neutralized) | 0.7 |
| Igepal CA-887 Surfactant | 8.9 |
| Water | 52.5 |
| Total | 100.0 |

TABLE 2B

Properties of Pigment Dispersion (Phthalocyanine Blue)

| Properties o | Example 2 Milled with a recirculating Netzsch Mill using 500 grams of 0.20 mm Polystyrene Media for 5 hours | Example 2 Milled with a Premier Mill 0.8-1.0 mm ZrSi Media |
| --- | --- | --- |
| Mean Volume particle size (nm) | 114 | 210 |
| D50 means particle size (nm) | 106 | 190 |
| Color Strength (%) | 111 | — |
| Adjusted DE | 1.55 | — |
| db* | −1.47 | — |

EXAMPLE 3

Dispersion (Calcium Lithol)

A small particle size red aqueous dispersion was prepared by taking a Calcium Lithol dispersion, RCD-9210 (Sun Chemical) having a particle size of mv=323 nm and a d50 of 307 nm. The composition included 22.8% pigment, 13.6% resin, 8.9% and 63.6% water. This is a commercial dispersion manufactured on a horizontal mill utilizing 0.8-1.0 mm ceramic media. To this dispersion, a resin solution and water were added as follows: 80.0 grams RCD-9210, 10.0 grams of Joncryl® 674 solution (30% solids) and 10.0 grams of water. This dispersion was then mixed with 75.0 grams of 100μ PMMA beads (MBX-100, Nagase) serving as milling media, and subsequently mixed on a Silverson Mixer (L4RT) at 4400 RPM for 10 hours. This dispersion reached a particle size of mv=125 nm and d50=116 nm. The beads were separated through a 40μ Whatman No. 417 filter. The composition is provided in Table 3A below.

A bleach of this dispersion (1 part dispersion to 50 parts Porter paint) versus that of RCD-9210, and adjusted to equal pigment loading, indicated a 132% strength with an adjusted DE of 3.50 and a dC of 3.34 indicating a higher chroma. The results are provided in Table 3B below.

TABLE 3A

Example 3 Pigment Dispersion (Calcium Lithol)

| Material (wt. %) | Example 3 RCD-9210 |
| --- | --- |
| Pigment Red | 18.2 |
| Joncryl 674 Resin Solution (30% solids, 70% water, ammonia neutralized) | 46.3 (13.88% solids) |
| Water | 35.5 |
| Total | 100.0 |

TABLE 3B

Properties of Pigment Dispersion (Calcium Lithol)

| Properties | Example 3 Milled with a Silverson Mixer with 75.0 grams of 100 um PMMA beads for 10 hours | Example 3 Milled with a Horizontal Mill using 0.8-1.0 mm Ceramic Media |
| --- | --- | --- |
| Mean Volume particle size (nm) | 125 | 323 |
| D50 means particle size (nm) | 116 | 307 |
| Color Strength (%) | 132 | — |
| Adjusted DE | 3.50 | — |
| dC | 3.34 | — |

EXAMPLE 4

Dispersion (Y/S Lithol Rubine)

A small particle size red aqueous dispersion was prepared by taking a (yellow/shade) Lithol Rubine dispersion, RCD-9272 (Sun Chemical) having a particle size of mv=240 nm and a d50 of 230 nm. The composition included 24.0% pigment, 9.6% resin and 66.4% water. This is a commercial dispersion manufactured on a horizontal mill utilizing 0.8-1.0 mm ceramic media. To this dispersion a resin solution and water were added as follows: 80.0 grams RCD-9272, 10.0 grams of Joncryl® 674 solution (30% solids) and 10.0 grams of water. This dispersion was then mixed with 75.0 grams of 100μ PMMA beads (MBX-100, Nagase) serving as milling media, and subsequently mixed on a Silverson Mixer (L4RT) at 4400 RPM for 5 hours. The composition is provided in Table 4A below. This dispersion reached a particle size of mv=121 nm and d50=112 nm. The beads were separated through a 40μ Whatman No. 417 filter.

A bleach of this dispersion (1 part dispersion to 50 parts Porter paint) versus that of RCD-9272, and adjusted to equal pigment loading, indicated a 117% strength with an adjusted DE of 1.74 and a dC of 1.32 indicating a higher chroma. The results are provided in Table 4B below.

TABLE 4A

Example 4 Pigment Dispersion (Y/S Lithol Rubine)

| Material (wt. %) | Example 4 RCD-9272 |
| --- | --- |
| Pigment Y/S Lithol Rubine | 19.2 |
| Joncryl 674 Resin Pellets Solution (30% solids, 70% water, ammonia neutralized) | 35.6 (10.68% solids) |
| Water | 45.2 |
| Total | 100.0 |

TABLE 4B

Properties of Pigment Dispersion (Y/S Lithol Rubine)

| Properties | Example 4 Milled with a Silverson Mixer with 75.0 grams of 100 um PMMA beads for 5 hours | Example 4 Milled with a Horizontal Mill using 0.8-1.0 mm Ceramic Media |
|---|---|---|
| Mean Volume particle size (nm) | 125 | 323 |
| D50 means particle size (nm) | 116 | 307 |
| Color Strength (%) | 132 | — |
| Adjusted DE | 3.50 | — |
| dC | 1.32 | — |

EXAMPLE 5

Dispersion (B/S Lithol Rubine)

A small particle size red aqueous dispersion was prepared by taking a (blue/shade) Lithol Rubine dispersion, RFD-9587 (Sun Chemical) having a particle size of mv=234 nm and a d50 of 212 nm, and having a composition of 29.0% pigment, 11.0% resin and 60.0% water. This is a commercial dispersion manufactured on a horizontal mill utilizing 0.8-1.0 mm ceramic media. The primary application is for the aqueous flexographic ink market. To this dispersion a resin solution and water were added as follows: 80.0 grams RFD-9587, 10.0 grams of Joncryl® 674 solution (30% solids) and 10.0 grams of water. This dispersion was then mixed with 75.0 grams of 100µ PMMA beads (MBX-100, Nagase) serving as milling media, and subsequently mixed on a Silverson Mixer (L4RT) at 4400 RPM for 5 hours. The composition is provided in Table 5A below. This dispersion reached a particle size of mv=75 nm and d50=71 nm. The beads were separated through a 40µ Whatman No. 417 filter.

A bleach of this dispersion (1 part dispersion to 50 parts Porter paint) versus that of RFD-9587, and adjusted to equal pigment loading, indicated a 114% strength with an adjusted DE of 1.69 and a dC of 1.58 indicating a higher chroma. The results are provided in Table 5B below.

TABLE 5A

Example 5 Pigment Dispersion (B/S Lithol Rubine)

| Material (wt. %) | Example 5 RFD-9587 |
|---|---|
| Pigment B/S Lithol Rubine | 23.2 |
| Joncryl 674 Resin Pellets | 39.3 (11.8% solids) |
| Water | 37.5 |
| Total | 100.0 |

TABLE 5B

Properties of Pigment Dispersion (B/S Lithol Rubine)

| Properties | Example 5 Milled with a Silverson Mixer with 75.0 grams of 100 um PMMA beads for 5 hours | Example 5 Milled with a Horizontal Mill using 0.8-1.0 mm Ceramic Media |
|---|---|---|
| Mean Volume particle size (nm) | 75 | 234 |
| D50 means particle size (nm) | 71 | 212 |
| Color Strength (%) | 114 | — |

TABLE 5B-continued

Properties of Pigment Dispersion (B/S Lithol Rubine)

| Properties | Example 5 Milled with a Silverson Mixer with 75.0 grams of 100 um PMMA beads for 5 hours | Example 5 Milled with a Horizontal Mill using 0.8-1.0 mm Ceramic Media |
|---|---|---|
| Adjusted DE | 1.69 | — |
| dC | 1.58 | — |

EXAMPLE 6

Dispersion (Phthalocyanine Blue for UV Flexography)

A small particle size UV dispersion was prepared having the following composition: 25.00% 249-1539 Blue 15:4 pigment, 11.00% Solsperse® 39000, 2-PEA Monomer (SR339 from Sartomer), 1.00% Genorad® 16 inhibitor and 0.35% Ethanox 703 inhibitor. This was milled on Buhler K60 mill charged with 0.65 mm YTZ beads. The composition is provided in Table 6A below. A particle size of mv=111 nm and d50=104 nm was achieved. A comparative Blue 15:4 commercial dispersion for UV flexographic applications, UVD-B354, exhibited a particle size mv=173 and d50=162. This dispersion was made by using a 3-Roller Mill. The results are provided in Table 6B below.

TABLE 6A

Example 6 Pigment Dispersion (Phthalocyanine Blue for UV Flexography)

| Material (wt. %) | Example 6 |
|---|---|
| Pigment 249-1539 Blue 15:4 Pigment | 25.0 |
| Solsperse 39000 | 11.0 |
| 2-PEA Monomer (SR339 from Sartomer) | 62.65 |
| Genorad 16 Inhibitor | 1.0 |
| Ethanox 703 Inhibitor | 0.35 |
| Total | 100.0 |

TABLE 6B

Properties of Pigment Dispersion (AAOT Yellow)

| Properties | Example 6 Milled with a Buhler K60 0.65 YTZ beads | Commercial Sun UVD-B354 |
|---|---|---|
| Mean Volume particle size (nm) | 111 | 173 |
| D50 means particle size (nm) | 104 | 162 |

EXAMPLE 7

Finished Ink

An aqueous ink was formulated from the dispersion prepared in Example 1. An ink was made with 33.4% dispersion (30.8% pigment and 9.9% resin), 44.4% Joncryl® 138 emulsion (42.5% solids) and 22.2% water. The mixture was then shaken on a Harbil shaker to produce the final ink. The resultant binder-to-pigment ratio was 1.50 to 1 in the ink. A drawdown with a #6 Meyer rod on Leneta 3NT-1 coated paper gave an ink with a measured gloss (60° BYK Gardner micro-Tri-gloss) of 66 units as compared with Control YCD-2004 of 52 units.

The contrast ratio is measured as follows: using a spectrophotometer, measure the color of the black bar on the Leneta 3NT-1 paper; measure the control (YCD-2004) over the black bar. This DE is defined as standard DE. Next, measure the same for the inventive ink. This is defined as sample DE. The following is the contrast ratio sample DE/standard DE. A number<1 implies that the sample is more transparent than standard. The ink of Example 8 as compared with Control YCD-2004 has a contrast ratio value of 0.47. This signifies higher transparency for the ink of Example 7 relative to the control. The composition and results are provided in Table 7 below.

TABLE 7

Finished Ink

| Material | Wt. % | Grams |
| --- | --- | --- |
| Pigment Dispersion of Example 2 | 33.4 | 15.0 |
| Joncryle 138 Emulsion (42.5% solids) | 44.4 | 20.0 |
| Water | 22.2 | 10.0 |
| Total | 100.0 | 45.0 |
| Solid Binder to Solid Pigment Ratio | 1.50:1.0 | 19.0:12.65 |
| Contrast Ratio | 0.47 | — |
| Gloss at 60° (units) | 66 | — |

*STD DE is based upon Ink including BCD-9444 dispersion

EXAMPLE 8

Finished Ink

An aqueous ink was formulated from the dispersion prepared in Example 2. 15.0 grams of the dispersion of Example 1 was diluted with 20.0 grams of Joncryl® 138 emulsion (42.5% solids, BASF) and 10.0 grams of water. This ink contained 4.6 grams of C.I. Pigment Blue 15:3 and 10.0 grams of total resin. The final binder to pigment ratio was about 2.2. The mixture was then shaken on a Harbil shaker to produce the final ink. A drawdown was prepared using a #6 Meyer rod on polyester film gave an ink which measured a db* of −5.68 units (bluer) and da* of 9.21 units (redder) than a drawdown made from Control BCD-9448 dispersion. The composition and results are provided in Table 8 below.

TABLE 8

Finished Ink

| Material | Wt. % | Grams |
| --- | --- | --- |
| Pigment Dispersion of Example 1 | 33.0 | 15.0 |
| Joncryl 138 Emulsion (42.5% solids) | 44.4 | 20.0 |
| Water | 23.0 | 10.0 |
| Total | 100.0 | 45.0 |
| Solid Binder to Pigment Ratio | 1.5:1 | 8.6:5.7 |
| Contrast Ratio (DE/Std DE) | 0.77 | — |
| db* (units) | −5.68 | — |
| da* (units) | 9.21 | — |
| dc* adjusted | 2.24 | — |
| Color Strength | 111.9 | — |
| Gloss at 60° (units) | 45.0 | — |

*STD DE is based upon Ink Including BCD-9848 dispersion

EXAMPLE 9

Finished Ink (Calcium Lithol)

An aqueous ink was formulated from the dispersion prepared in Example 3. An ink was made with 33.4% dispersion (19.8% pigment and 15.1% resin), 44.4% Joncryl® 138 emulsion (42.5% solids) and 22.2% water. The mixture was then shaken on a Harbil shaker to produce the final ink. The resultant binder-to-pigment ratio was 3.8 to 1 in the ink. A drawdown with a #6 Meyer rod on Leneta 3NT-1 coated paper gave an ink with a measured gloss (60° BYK Gardner micro-Tri-gloss) of 49.7 units as compared with the Control RCD-9210 of 45.3 units. The ink was more transparent than Control RCD-9210, as quantified by the contrast ratio value of 0.86. The composition and results are provided in Table 9 below.

TABLE 9

Finished Ink including Pigment Dispersion of Example 3

| Material | Wt. % | Grams |
| --- | --- | --- |
| Pigment Dispersion of Example 3 | 33.4 | 15.0 |
| Joncryl 138 Emulsion (42.5% solids) | 44.4 | 20.0 |
| Water | 22.2 | 10.0 |
| Total | 100.0 | 45.0 |
| Solid Binder to Solid Pigment Ratio | 3.8:1.0 | 23.33:6.08 |
| Contrast Ratio | 0.86 | — |
| dc* adjusrted | 1.99 | — |
| Color Strength | 127.8 | — |
| Gloss (units) | 49.7 | — |

*STD DE is based upon Ink including RCD-9210 dispersion

EXAMPLE 10

Finished Ink (Y/S Lithol Rubine)

An aqueous ink was formulated from the dispersion prepared in Example 4. An ink was made with 33.4% dispersion (20.7% pigment and 11.5% resin), 44.4% Joncryl® 138 emulsion (42.5% solids) and 22.2% water. The mixture was then shaken on a Harbil shaker to produce the final ink. The resultant binder-to-pigment ratio was 3.49 to 1 in the ink. A drawdown with a #6 Meyer rod on Leneta 3NT-1 coated paper gave an ink with a measured gloss (60° BYK Gardner micro-Tri-gloss) of 47.1 units as compared with the Control RCD-9272 of 37.9 units. The ink was more transparent than Control RCD-9272, as quantified by the contrast ratio value of 0.78. The composition and results are provided in Table 10 below.

TABLE 10

Finished Ink including Pigment Dispersion of Example 4

| Material | Wt. % | Grams |
| --- | --- | --- |
| Pigment Dispersion of Example 4 | 33.4 | 15.0 |
| Joncryl 138 Emulsion (42.5% solids) | 44.4 | 20.0 |
| Water | 22.2 | 10.0 |
| Total | 100.0 | 45.0 |
| Solid Binder to Solid Pigment Ratio | 3.49:1.0 | 22.43:6.41 |
| Contrast Ratio | 0.78 | — |
| dc* adjusted | 1.19 | — |
| Color Strength | 101.2 | — |
| Gloss (units) | 47.1 | — |

*STD DE is based upon Ink including RCD-9272 dispersion

EXAMPLE 11

Finished Ink (B/S Lithol Rubine)

An aqueous ink was formulated from the dispersion prepared in Example 5. An ink was made with 33.4% dispersion (26.0% pigment and 13.2% resin), 44.4% Joncryl® 138 emulsion (42.5% solids) and 22.2% water. The mixture was then shaken on a Harbil shaker to produce the final ink. The resultant binder-to-pigment ratio was 2.94 to 1 in the ink. A drawdown with a #6 Meyer rod on Leneta 3NT-1 coated paper gave an ink with a measured gloss (60° BYK Gardner micro-Tri-gloss) of 53.1 units as compared with the standard product RCD-9587 of 43.1 units. The ink was more transparent than Control RFD-9587, as quantified by the contrast ratio value of 0.60. The composition and results are provided in Table 11 below.

TABLE 11

Finished Ink including Pigment Dispersion of Example 5

| Material | Wt. % | Grams |
|---|---|---|
| Pigment Dispersion of Example 5 | 33.4 | 15.0 |
| Joncryl 138 Emulsion (42.5% solids) | 44.4 | 20.0 |
| Water | 22.2 | 10.0 |
| Total | 100.0 | 45.0 |
| Solid Binder to Solid Pigment Ratio | 2.94:1.0 | 22.81:7.74 |
| Contrast Ratio | 0.60 | — |
| dc* adjusted | 1.43 | — |
| Color Strength | 106.6 | — |
| Gloss (units) | 47.1 | — |

*STD DE is based upon Ink including RCD-9587 dispersion

EXAMPLE 12

Finished Ink

A UV flexographic ink was formulated from the dispersion prepared in Example 6. A UV ink was made with 56.0% dispersion, 26.0% CN2102E epoxy acrylate oligomer (Sartomer), 10.0% SR9003 diacrylate monomer (Sartomer), 4.0% Irgacure® 369 (Ciba), 2.5% 4-PBZ (IGM), 1.0% ITZ (IGM) and 0.5% Genorad® 16 (Rahn). The binder-to-pigment in this ink was about 6:1. An ink was made with the comparative dispersion UVD-B354 as follows: 31.0% UVD-B354, 17.0% CN2012E (Sartomer), 44.0% SR9003, 4.0% Irgacure® 369 (Ciba), 2.5% 4-PBZ (IGM), 1.0% ITZ (IGM) and 0.5% Genorad® 16 (Rahn). Each of these inks contain the same pigment and oligomer content after allowing for adjustment for the differing pigment contents between the two dispersions. The inks were drawndown with a #6 Meyer rod on a AG-5300 card (Byk) using a K-proofer. Colorimetric readings were performed using a Spectracolor instrument. The ink of the example reads 122% strong to the ink of UVD-B354, and it has a da*=−1.22 implying greener in shade. The composition and results are provided in Table 12 below.

TABLE 12

Finished Ink including Pigment Dispersion of Example 6

| Material | Wt. % of Ink including Ex. 6 | Wt. % of Ink including UVD-B354 |
|---|---|---|
| Pigment Dispersion | 56.0 (Ex. 6) | 31.0 |
| CN2012E (Sartomer) | 26.0 | 17.0 |
| SR9003 diacrylate monomer (Sartomer) | 10.0 | 44.0 |
| Irgacure 369 (Ciba) | 4.0 | 4.0 |
| ITZ (IGM) | 1.0 | 1.0 |
| 4-PBZ (IGM) | | 2.5 |
| Genorad 16 (Rahn) | 0.5 | 0.5 |
| Total | 100.0 | |
| Solid Binder to Solid Pigment Ratio | 6.1:1.0 | — |
| Da* | −1.22 | — |
| Color Strength | 122 | — |

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed is:

1. A printing ink or coating for improving coloristic properties, said ink or coating having a viscosity greater than about 35 cps, comprising:
   a pigment dispersion including a pigment;
   a binder; and
   a solvent, wherein a mean particle size (d50) of solid particles of said pigment dispersion is less than about 120 nm and the mean volume weighted average of solid particles of said pigment dispersion is less than about 120 nm; wherein a mass ratio of solid particles of said binder to said pigment is greater than or equal to about 1.5:1.

2. The printing ink or coating of claim 1, wherein said binder is selected from the group consisting of: acrylic acids, (meth)acrylates, rosins of abietic acid and pentaerythritol, polystyrene and styrene maleic anhydrides, epoxies, polyesters, polyurethanes, silicones, vinyls, blocked isocyanates, cellulose esters, alkyds, and mixtures thereof.

3. The printing ink or coating of claim 1, wherein said pigment is selected from the group consisting of: C.I. Pigment Black 1, 2, 3, 6, 7, 9, 11, 12, 14, 15, 22, 26, 27, 28, 29, 30, 31, 32, 33, 34 and 35; C.I. :Pigment Green 7, 18, 20, 21, 22, 36, 37, 47, 54, and 58; C.I. Pigment Blue 15:1, 15:2, 15:3, 15:4, 15:6, 16, 21, 22, 27, 30, 60, 64, 65, 73, 75, and 76; C.I. Pigment Violet 19, 23, 29, 31, 33, and 37; C.I. Pigment Red 122, 123, 144, 149, 166, 168, 170, 171, 175, 176, 178, 179, 180, 183, 189, 190, 192, 196, 202, 208, 209, 214, 216, 220, 221, 224, 226, 242, 248, 254, 255, 260, 264, 265, 271 and 275; C.I. Pigment Orange 36, 40, 43, 51, 60, 61, 62, 64, 66, 69, 71, 72, 73, and 77; Pigment Yellow 24, 38, 40, 53, 74, 83, 93, 94, 95, 108, 109, 110, 119, 120, 123, 138, 139, 150, 151, 154, 155, 157, 158, 160, 161, 162, 167, 170, 171, 173, 174, 175, 180, 181, 184, 185, 192, 193, 194, 199, 213, and 218; C.I. Pigment White 4, 5, 6, 6:1, 7, 8, 9, 10, 12, 13, 14, 15, 18, 18:1, 19, 21, 22, 23, 24, 25, 26, 27, 28, 32, 33, and 36; and mixtures thereof.

4. The printing ink or coating of claim 1, wherein said solvent comprises water.

5. The printing ink or coating of claim 1, wherein said pigment is less than about 20 wt. %.

6. The printing ink or coating of claim 1, further comprising a photoinitiator.

7. A method of coloring a substrate in contact printing applications comprising the steps of:

providing the substrate including a surface;
providing a printing ink or coating of claim 1;
transferring said ink or coating onto a transfer object; and
contacting said surface with said transfer object to transfer said ink or coating onto said surface.

8. The method of claim 7, wherein said pigment dispersion includes a pigment selected from the group consisting of: C.I. Pigment Black 1, 2, 3, 6, 7, 9, 11, 12, 14, 15, 22, 26, 27, 28, 29, 30, 31, 32, 33, 34 and 35; C.I. Pigment Green 7, 18, 20, 21, 22, 36, 37, 47, 54, and 58; C.I. Pigment Blue 15:1, 15:2, 15:3, 15:4, 15:6, 16, 21, 22, 27, 30, 60, 64, 65, 73, 75, and 76; C.I. Pigment Violet 19, 23, 29, 31, 33, and 37; C.I. Pigment Red 122; 123, 144, 149, 166, 168, 170, 171, 175, 176, 178, 179, 180, 183, 189, 190, 192, 196, 202, 208, 209, 214, 216, 220, 221, 224, 226, 242, 248, 254, 255, 260, 264, 265, 271 and 275; C.I. Pigment Orange 36, 40, 43, 51, 60, 61, 62, 64, 66, 69, 71, 72, 73, and 77; C.I. Pigment Yellow 24, 38, 40, 53, 74, 83, 93, 94, 95, 108, 109, 110, 119, 120, 123, 138, 139, 150, 151, 154, 155, 157, 158, 160, 161, 162, 167, 170, 171, 173, 174, 175, 180, 181, 184, 185, 192, 193, 194, 199, 213, and 218; C.I. Pigment White 4, 5, 6, 6:1, 7, 8. 9, 10, 12, 13, 14, 15, 18, 18:1, 19, 21, 22, 23, 24, 25, 26, 27, 28, 32, 33, and 36; and mixtures thereof.

9. The method of claim 7, wherein said pigment is about 15 to75 wt. % of said pigment dispersion.

10. The method of claim 7, wherein said pigment dispersion comprises a binder selected from the group consisting of: acrylic acids, (meth)acrylates, rosins of abietic acid and pentaerythritol, polystyrenes and styrene maleic anhydrides, epoxies, polyesters, polyurethanes, silicones, vinyls, blocked isocyanates, cellulose esters, alkyds, and mixtures thereof.

11. A printing ink or coating for improving coloristic properties comprising:
a pigment dispersion including a pigment;
a binder;
a photoinitiator; and
a solvent,
wherein a mean particle size (d50) of solid particles of said pigment dispersion is less than about 120 nm and the mean volume weighted average of solid particles of said pigment dispersion is less than about 120 nm, and
a mass ratio of solid particles of said binder to said pigment is greater than or equal to about 1.5:1.

12. The printing ink or coating of claim 11 wherein said binder is selected from the group consisting of: acrylic acids, (meth)acrylates, rosins of abietic acid and pentaerythritol, polystyrene and styrene maleic anhydrides, epoxies, polyesters, polyurethanes, silicones, vinyls, blocked isocyanates, cellulose esters, alkyds, and mixtures thereof.

13. The printing ink or coating of claim 11, wherein said pigment is selected from the group consisting of: C.I. Pigment Black 1, 2, 3, 6, 7, 9, 11, 12, 14, 15, 22, 26, 27, 28, 29, 30, 31, 32, 33, 34 and 35; C.I. Pigment Green 7, 18, 20, 21, 22, 36, 37, 47, 54,and 58; C.I. Pigment Blue 15:1, 5:2, 15:3, 15:4, 15:6, 16, 21, 22, 27, 30, 60, 64, 65, 73, 75, and 76; C.I. Pigment Violet 19, 23, 29, 31, 33, and 37; C.I. Pigment Red 122, 123, 144, 149, 166, 168, 170, 171, 175, 176, 178, 179, 180, 183, 189, 190, 192, 196, 202, 208, 209, 214, 216, 220, 221, 224, 226, 242, 248, 254, 255, 260, 264, 265, 271, and 275; C.I. Pigment Orange 36, 40, 43, 51, 60, 61, 62, 64, 66, 69, 71, 72, and 77; C.I. Pigment Yellow 24, 38, 40, 53, 74, 83, 93, 94, 95, 108, 109; 110, 119, 120, 123, 138, 139, 150, 151, 154, 155, 157, 158, 160, 161, 162, 167, 170, 171, 173, 174, 175, 180, 181, 184, 185, 192, 193, 194, 199, 213, and 218; C.I. Pigment White 4, 5, 6, 6:1, 7, 8, 9, 10, 12, 13, 14, 15, 18, 18:1, 19, 21, 22, 23, 24, 25, 26, 27, 28, 32, 33, and 36; and mixtures thereof.

14. The printing ink or coating of claim 11, wherein said solvent comprises water.

15. The printing ink or coating of claim 11, wherein said pigment is less than about 20 wt. %.

16. A printing ink or coating for improving coloristic properties, said ink or coating having a viscosity greater than about 35 cps, comprising:
a pigment dispersion including a pigment;
a binder; and
a solvent, wherein
a mean particle size (d50) of solid particles of said pigment dispersion is less than about 120 nm and the mean volume weighted average of solid particles of said pigment dispersion is less than about 120 nm; wherein said solvent comprises water.

* * * * *